July 21, 1964   J. M. BRANDSTADTER   3,141,388
LINEAR ACTUATOR
Filed March 27, 1961   3 Sheets-Sheet 1
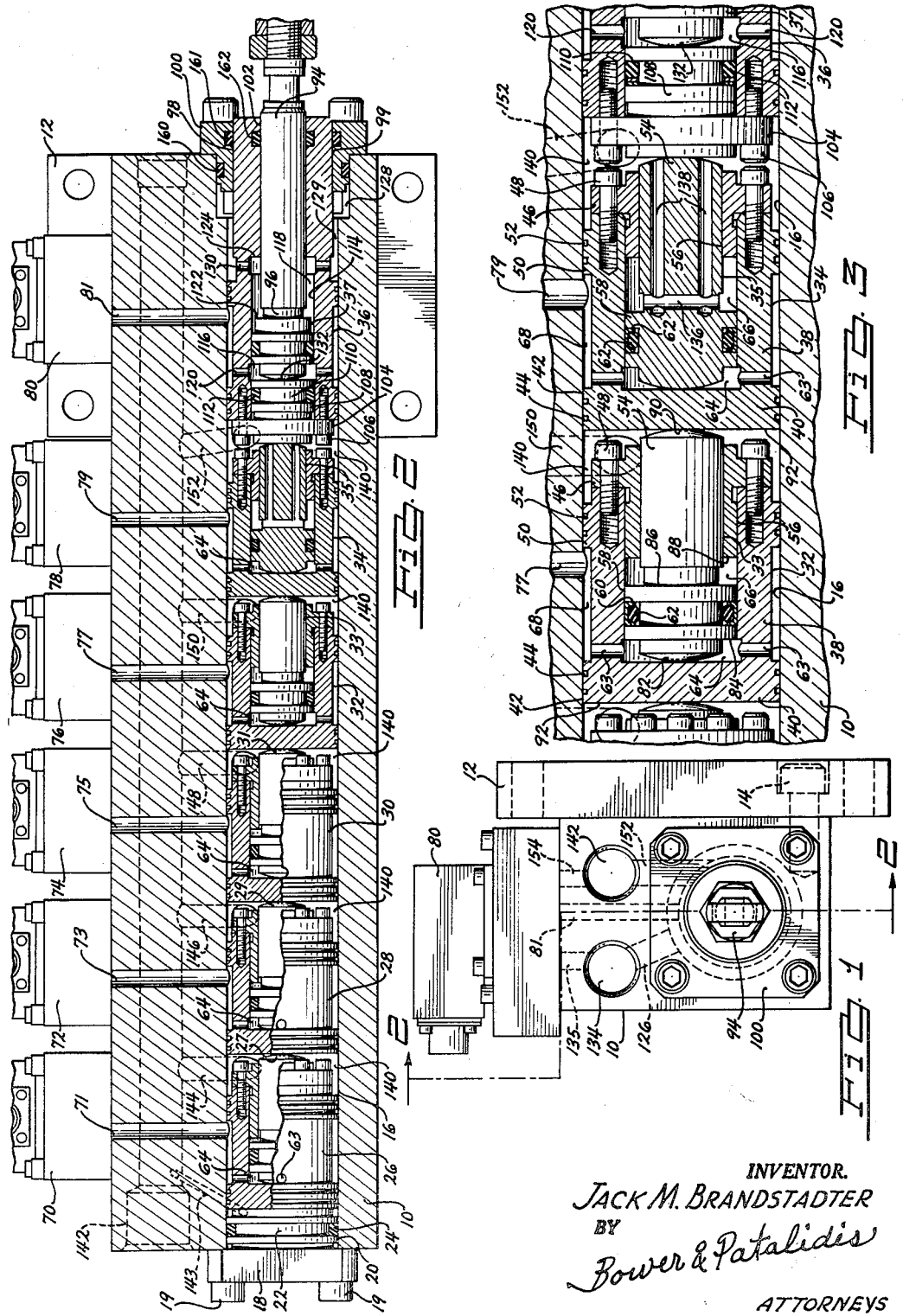
INVENTOR.
JACK M. BRANDSTADTER
BY
Bower & Patalidis
ATTORNEYS

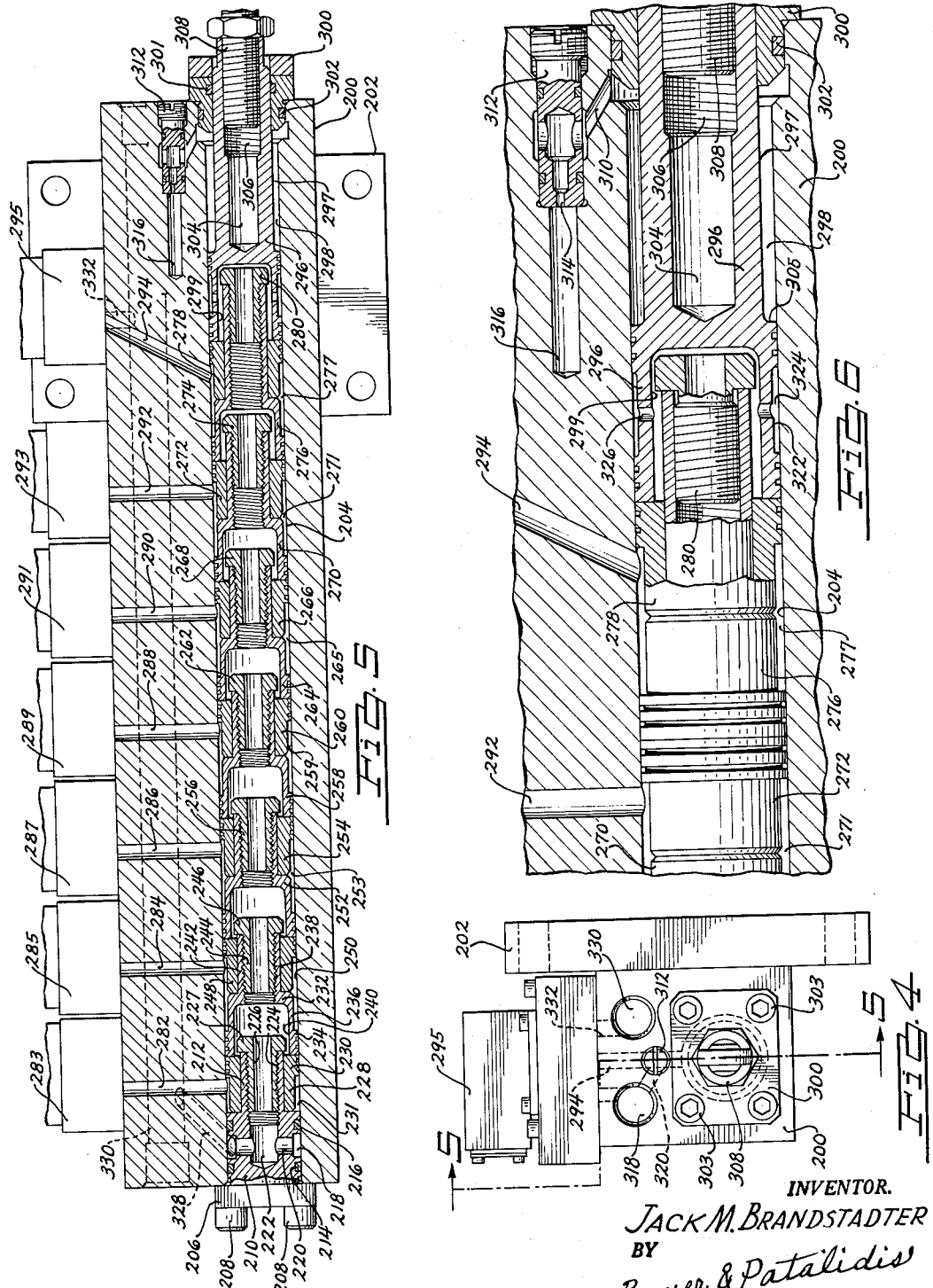

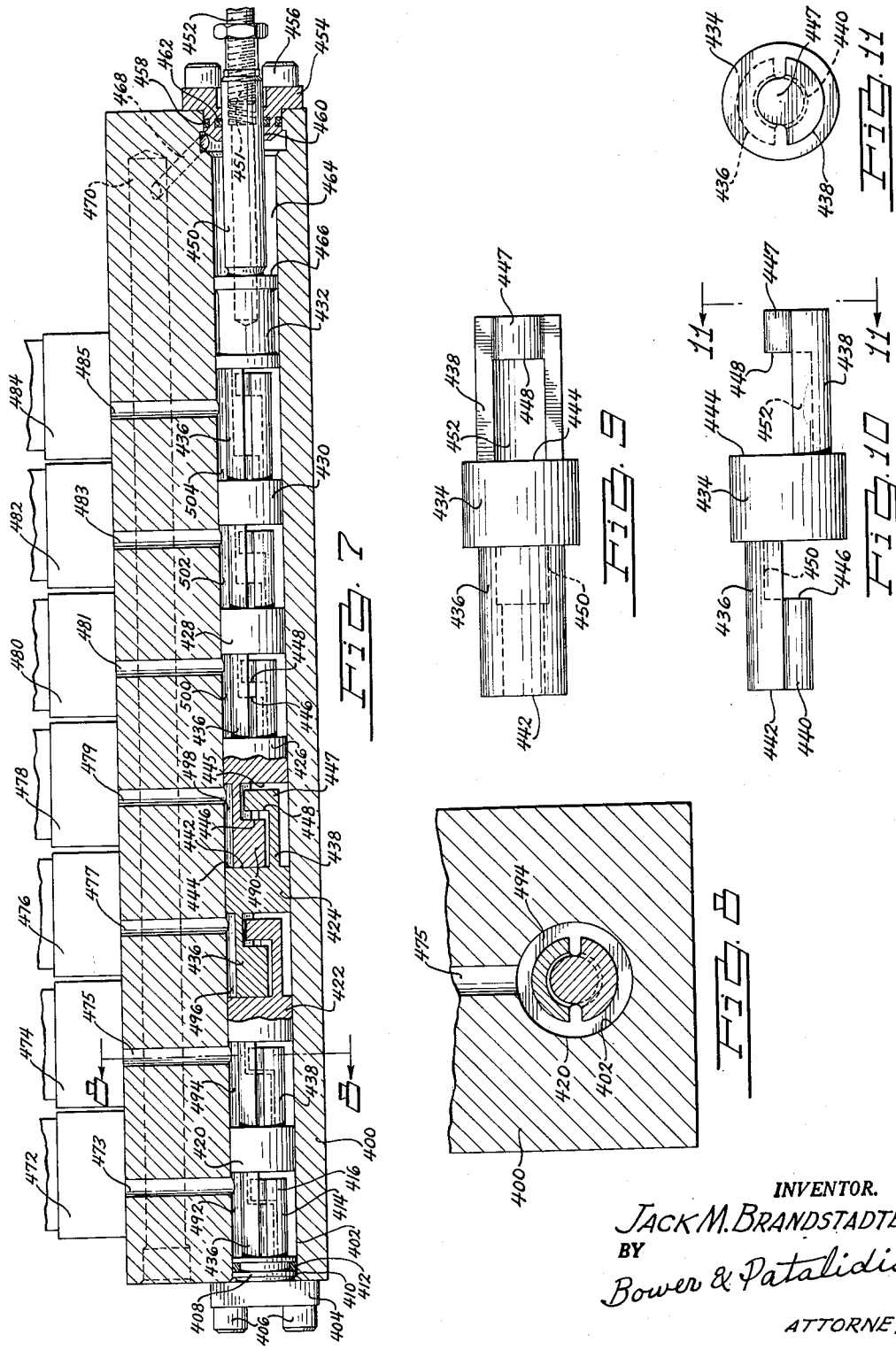

United States Patent Office 3,141,388
Patented July 21, 1964

3,141,388
LINEAR ACTUATOR
Jack M. Brandstadter, Royal Oak, Mich., assignor to Cadillac Gage Company, Roseville, Mich.
Filed Mar. 27, 1961, Ser. No. 98,549
1 Claim. (Cl. 92—51)

This invention relates to improvements in linear actuators, and more particularly relates to servo-mechanisms for linearly positioning a shaft by fluid means in response to selective input signals.

In the art of data processing, digital computers, machine-tools, automation, and the like, there exists a need for devices which accurately position a shaft or a movable reference output element in response to information applied to the input of the device. Various servo-mechanism of this nature have been proposed; they may be actuated by electrical means or by purely mechanical means. It is an object of this invention to provide a linear shaft actuator and positioner which is selectively operated by fluid pressure means. The fluid may be oil, water, compressed air, a gas, steam, or any other like fluid.

The transmission of control information in systems of the character herein mentioned is commonly carried out in the binary numerical system. It is frequently desirable to convert the digital representation of the binary number into an analogue equivalent such as the linear position of a movable reference output element or an angular shaft rotation. It is, therefore, another object of this invention to provide selectively operable fluid motor means for converting a binary information into an analogue equivalent in the form of a linear shaft position. It is apparent to those skilled in the art that such an analogue linear displacement and positioning can be easily converted, in applications where so desired, into an angular shaft rotation and positioning through a simple rocker arm assembly, rack and pinion assembly, or the like.

It is a further object of this invention to provide a compact, self-contained, fluid motor powered binary to linear shaft position converter.

It is another object of this invention to provide a linear actuator utilizing a relatively small number of simple elementary identical parts in order to reduce manufacturing cost and inventory.

It is an additional object of this invention to provide a linear actuator developing a great power with practically no lag in operation and almost instantaneous response.

It is a further object of this invention to provide a linear actuator having a number of discrete positions which correspond to the formula $N=2^n$, in which N denotes the number of discrete positions and $n$ denotes the number of individual unit elements being placed in series within a common housing. For example, if it is desired to provide for 8 different discrete positions of the output reference element, the number of unit elements or stages to be used is 3; if 128 discrete positions are required, 7 unit elements, or stages, must be placed within the housing.

A further object of this invention is to have a predetermined number of discrete positions which are accurately repeatable ad infinitum, together with positive indexing at each discrete position.

Still a further object of this invention is to provide a linear actuator which has a response time that can be tailored according to the requirements of the controlled equipment and which has positive dampening of the acceleration and deceleration of the movable shaft.

An additional object of this invention is to provide a device which can utilize readily available pressure fluid hardware, tubings, valves, accumulators, and the like.

Another object is to provide a functional unit endowed with high reliability and long life.

Additional objects and advantages of the invention will become apparent from the following description and appended claim, taken in connection with the accompanying drawings, which disclose, by way of example, the principles of this invention and some of the best modes which have been contemplated of applying these principles.

In the drawings:

FIG. 1 is an end elevation view of a linear positioner embodying the principles of this invention;

FIG. 2 is a longitudinal elevation view, partly in cross-section, with some of the elements broken away, and taken along line 2—2 of FIG. 1;

FIG. 3 is a partial view, similar to FIG. 2, but showing some of the component parts at a larger scale for more clarity;

FIG. 4 is an end elevation view of a modification of the invention;

FIG. 5 is a longitudinal cross-section view taken along line 5—5 of FIG. 4;

FIG. 6 is an enlarged view, similar to FIG. 5, showing some of the components in elevation and other components in cross-section for more clarity;

FIG. 7 is a longitudinal cross-section view of another modification of the invention with some parts broken away to show their internal configuration;

FIG. 8 is a transversal cross-section view taken along line 8—8 of FIG. 7;

FIG. 9 is a top view of one of the component parts shown in FIG. 7;

FIG. 10 is a side elevation view of the part shown in FIG. 9;

FIG. 11 is an end view from line 11—11 of FIG. 10.

Referring to the example of FIGS. 1–3, the invention consists in general of a housing having one main bore. The bore contains six separate piston-cylinder assemblies or stages. Six transfer valves are mounted on the housing. Each transfer valve actuates one piston by admitting to or exhausting fluid pressure from the corresponding cylinder.

The first five piston-cylinder assemblies or stages are loaded towards their retracted position by supply pressure acting upon a partial area of the sixth cylinder. This area could be arbitrarily chosen as equal to one half the piston area, or to any other value deemed preferable, as long as it is less than the piston area. Therefore, when a piston area is connected to exhaust, the piston is retracted; and when it is connected to supply pressure, the piston is extended.

Each piston pushes against the cylinder in front of it with the exception of the sixth piston which is connected directly to the output shaft. In this way, each piston displaces the output shaft the exact amount of that piston stroke and a combination of pistons displaces the output shaft the sum of the piston strokes being utilized. In the preferred embodiment shown, the stroke of each piston is twice the stroke of the immediately preceding piston. In this fashion, with six piston-cylinder assemblies or stages available, there are sixty-four discrete positions available at the output, including the fully retracted position.

Referring to the drawings (FIGS. 1–3), a housing 10 is fastened to a mounting bracket 12 through bolts or other fastening means 14. The housing has a main bore 16 closed on one end by an end cap 18 fastened thereon by cap screws or bolts 19. This end cap is provided with a cylindrical undercut portion 20 adapted to fit within the bore 16 and having a groove 22 for holding a suitable O-ring seal 24 to seal the housing bore from the outside. The bore 16 contains six separate piston-cylinder assemblies or stages being designated generally by numerals 26, 28, 30, 32, 34 and 36 referring to the cylinders, and by numerals 27, 29, 31, 33, 35 and 37 referring to the corresponding pistons.

All the piston-cylinder assemblies or stages are substantially identical as to their operation and their components, with the exception of the last piston-cylinder assembly 36–37, as will be explained hereinafter.

As shown in FIG. 2 and more particularly in the enlarged view of FIG. 3, each cylinder consists of a body 38 closed on one end by an integral end plate 40. End plate 40 has an outwardly extending shoulder 42 with circular grooves 44. On the other end of the cylinder, a bushing sleeve 46 is fastened thereon by means of the cap screws or bolts 48. Proximate this end, the cylinder has another outwardly extending integral shoulder 50 with circular grooves 52. The shoulders 42–50 have a lap fit with bore 16 of the housing and are slidable therein; no O-ring or other sealing means are required in grooves 44 and 52 which function only as a means to equalize the pressure drop along the sides of the shoulders and to avoid side loading of the cylinders.

Within the cylinder is disposed a piston body 54 which is a spool slidable within the inner bore 56 of the bushing sleeve 46, and which has a shoulder 58 with a groove 60. Within the groove 60 is disposed a sealing ring 62 thereby preventing any communication between annular chamber 64 and annular space 66.

As seen in FIGS. 2 and 3, the device being shown in a fully retracted position, ports 63 offer a communication between the annular chamber 64 and the annular chamber 68 defined by shoulders 52 and 50 of cylinder body 38 in the space comprised between the outer diameter of cylinder body 38 and the bore 16 of the housing. Each annular chamber 68 communicates with the valves 70, 72, 74, 76, 78 and 80 through the fluid pressure conduits 71, 73, 75, 77, 79 and 81. Each valve, which is not part of this invention, is adapted to be selectively controlled to introduce a fluid under pressure into the annular chamber 68 of its corresponding piston-cylinder assembly or stage through the appropriate fluid pressure conduit. For example, when fluid pressure is introduced into the annular chamber 68 of assembly or stage 32–33, the fluid admitted into the annular chamber 64 through ports 63 acts upon the domed face 82 and the shoulder face 84 of piston 54. Piston 54 will then move until the face 86 of its shoulder 58 contacts the abutment 88 of the bushing sleeve 46. The domed end face 90 of the piston which is in contact with the face 92 of the next cylinder displaces at the same time that cylinder of a distance which is equal to the stroke of piston 54. Each successive cylinder placed between any operating piston-cylinder stage and the output shaft 94 is thus displaced a distance corresponding to the stroke of the operating piston, the last piston, 37, pushing directly upon the end 96 of the output shaft 94.

The last cylinder, 36, is constructed differently from the others. It is substantially longer and a portion of its outer diameter 98 is adapted to be slidable within the bore 99 of the end cap bushing 100 fastened to the open end of the housing 10 as shown in FIGS. 1 and 2. The reduced inner bore 102 of cylinder 36 is adapted to accept the slidable output shaft 94. The other end of cylinder 36 is closed by the end cap 104 fastened thereon by the cap screws or bolts 106 and having an integral projecting plug 108 with an appropriate sealing groove 110 and seal ring 112. In the inner bore 114 of the cylinder 36 is disposed the short piston body 37 separating the annular chamber 116, thus defined, from the annular chamber 118. Ports 120 allow fluid pressure introduced through conduit 81 to operate piston 37 when so desired. When this is permitted to occur, piston 37 is displaced until its face 122 contacts the abutment 124 of cylinder 36, moving the slidable output shaft 94 of a distance equal to the distance separating the said face 122 from the abutment 124. The annular chamber 118 is normally filled with supply pressure fluid admitted through passageway 126 (FIG. 1) leading into communicating annular spaces 128 and 129 which in turn communicate with chamber 118 through ports 130. The effect of this supply pressure is to maintain the device in a retracted position. As mentioned before, the effective area of face 122 is only a fraction of the effective area of face 132 of piston 37. The effective area of face 72–84 of each of the other five pistons is substantially the same as the effective area of face 132 of pistons 37. Therefore, when supply pressure fluid is introduced into the annular chamber 116 or into any of the annular chambers 64, the slidable shaft 94 is moved out of its retracted position and some of the pressure fluid contained within the annular chamber 118 is exhausted to conduit 134 (FIG. 1) and from there to the pressure supply accumulator (not shown) through conduit 135.

With the exception of piston 37, all the other pistons have passageways 136–138 to afford a communication between the annular chamber 66 and the annular chamber 140 defined by the space immediately preceding the end face 92 of a cylinder. These passageways, 136 and 138, are to allow an escape way to fluid present in chamber 66, and the annular chambers 140 are in turn exhausted to conduit 142 by way of channels 144, 146, 148, 150 and 152. The fluid is from there returned to a pump (not shown) through conduit 154. Also, any fluid leaking past the shoulders 42 of the cylinders collects in the annular chambers 140 and is exhausted in a similar fashion. Fluid leaking past the shoulder 42 of the first cylinder, 26, is exhausted through channel 143.

The O-ring seals 160, 161 and 162 are necessary to prevent leakage of fluid to the outside of the system.

The fully retracted position may be arbitrarily chosen to be position 0 which has a binary equivalent of 000000. The fully extended position may be arbitrarily chosen to be position 63 (binary 111111). In position 0 no pressure supply fluid is admitted to any of the piston-cylinder stages, and the device is maintained in its fully retracted position by the pressure supply fluid present in annular chamber 118 and acting upon the face 122 of the last piston, 37. In position 63, each control valve admits pressure supply fluid into its corresponding piston-cylinder stage. Each piston moves until its shoulder 86 is prevented from further travel by the abutment 88. As a result, the output shaft 94 is caused to travel a distance which is the sum of all the piston strokes. If $a$ is the stroke of piston 27, $b$ the stroke of piston 29, $c$ the stroke of piston 31, $d$ the stroke of piston 33, $e$ the stroke of piston 35, and $f$ the stroke of piston 37, the distance traveled by the output shaft 94 is $a+b+c+d+e+f$. The stroke $b$ is arbitrarily chosen twice the stroke $a$, $c$, twice the stroke $b$, $d$ twice the stroke $e$, $e$ twice the stroke $d$ and $f$ twice the stroke $e$.

It can thus be seen that, by selectively operating the control valves, any of the piston-cylinder stages can be selectively actuated to cause the output shaft to travel to a position which is the analogue equivalent of any binary number between 0 and 63. For example, if it is desired to selectively place the output shaft in a position equivalent to 53 (binary 110101), control valves 80, 78, 74 and 70 will be operated to admit supply pressure fluid to piston-cylinder stages 36–37, 34–35, 30–31 and 26–27, and control valve 76 and 72 will be operated to exhaust the supply pressure fluid from piston-cylinder stages 32–33 and 28–29. Piston 27, being actuated, travels the distance of its stroke, $a$. This in turn causes cylinder 28 to travel the same distance causing in turn cylinder 30 to travel the same distance. Piston 31, being actuated travels the distance of its own stroke, $c$ causing in turn cylinder 32 to travel a distance $a+c$. This, in turn, causes cylinder 34 to travel a distance $a+c$. Piston 35, being actuated, travels the distance of its one stroke, $e$. This causes cylinder 36 to travel a distance $a+c+e$. Finally, piston 37, being also actuated, travels also the distance of its own stroke $f$. Therefore, the output shaft 94 travels a distance $a+c+e+f$, and the position of the output shaft now represents the analogue of number 53.

In the example illustrated by FIGS. 4–6, there is shown another embodiment of the invention, using the same principles, but having a somewhat different configuration.

The main bore in the housing contains seven separate stages. Seven transfer valves are mounted on the housing. Each valve actuates one stage, in the same fashion as in the preceding embodiment, by admitting and exhausting fluid pressure to and from the corresponding stage.

Each stage consists of two main members slidably disposed end to end directly in the housing bore. When fluid pressure is introduced between the two members, this causes them to separate. Because the first member is in contact with the preceding stage assembly, or is a fixed member in the case of the first stage, only the second member can be displaced, pushing at the same time all the stages between it and the output shaft. The stroke of the moving member is limited by an abutment on a fixed reference member. In this way, each stage displaces the output shaft the exact amount of that stage stroke, and a combination of stages displaces the output shaft the sum of the strokes of the stages being utilized. The stroke of each stage is twice the stroke of the immediately preceding stage. In this fashion, with seven stages as shown, there are one hundred twenty-eight discrete positions available at the output.

All the stages are loaded towards their retracted position by supply fluid pressure acting upon a partial area of a reaction member. When this fluid is exhausted during expansion of the actuator, or when it is introduced into the housing during contraction of the actuator, the fluid must pass through an interchangeable fitting provided with a calibrated throttling port, thereby affording a means to tailor the response time of the device in function of the needs of the output. Such a calibrated port fitting may be used also on the preceding and on the third embodiments of the invention, although it is described only in combination with the present embodiment.

Referring now to FIGS. 4-6, which represent a modification of the invention, a housing 200, provided with a mounting backet 202, has a main bore 204 closed on one end by an end cap 206 fastened thereon by bolts or cap screws 208. This end cap is provided with an elongated cylindrical integral undercut portion 210 projecting within the bore 204 and having a stepped reduced diameter integral projection 212. The outside diameter of undercut portion 210 is equal to the inside diameter of bore 204 and has two circular grooves in which are placed two O-ring seals 214 and 216. Intermediate the two O-ring seals there is a wider groove 218 defining an annular chamber therein communicating through cross-drilled passageways 220 with inner bore 222 extending all the way to the end of the stepped reduced portion 212. This inner bore 222 has a thread 224 adapted to receive a hollow threaded stop member 226 having a head 227. A primary sleeve 228 is slidably mounted around the stepped integral projection 212 and has an outwardly extending grooved shoulder 230 having a diameter allowing a lap fit with main bore 204. An annular chamber 231 is thus defined between the reduced diameter of primary sleeve 228 and the bore 204 of the housing. The length of primary sleeve 228 is slightly less than the length of stepped integral projection 212, the difference between the two lengths being arbitrarily called $a$ for the sake of simplifying the subsequent description of the operation of the device. This difference in lengths determines the amount of permissible stroke $a$ of primary sleeve 228.

Immediately adjacent primary sleeve 228, and alined therewith within the bore 204, secondary sleeve 232 has three outer diameters of decreasing dimensions: grooved shoulder diameter 234 which is a lap fit to the bore 204, diameter 236 substantially identical to the smaller diameter of primary sleeve 228, and diameter 238 substantially identical to the outside diameter of integral projection 212. Secondary sleeve 232 has a two-step inner bore: a substantially large bore 240 adapted to clear the head 227 of hollow threaded stop member 226 and a smaller bore with a thread 242 adapted to receive a second hollow threaded stop member 244 having a head 246. On the outside diameter 238 of the secondary sleeve 232, second primary sleeve 248 is slidably mounted, defining an annular chamber 250. The length of the second primary sleeve 248 is slightly less than the length of the portion of secondary sleeve 232 having a diameter 238, allowing the primary sleeve to be slidably movable a quantity $b$ which is arbitrarily chosen to be twice the value of $a$.

The reduced portion 210 of end cap 206 and the first primary sleeve 228 form together the first stage of the device. The first secondary sleeve 232 and the second primary sleeve 248 form together the second stage of the device. The stroke $a$ of the first stage is determined as explained above, by the amount that the sleeve 228 can move until its end strikes the abutment formed by the head 227 of the hollow threaded stop member 226. Sleeve 248 has likewise its amount of travel $b$ stopped when it strikes the abutment of the head 246 of the hollow stop member 244. Five more similar stages are shown within the bore 204 consisting of: sleeves 252–254 with stop member 256 making up the third stage; sleeves 258–260 with stop member 262, the fourth stage; sleeves 264–266 with stop member 268, the fifth stage; sleeves 270–272 with stop member 274, the sixth stage; and sleeves 276–278 with stop member 280, the seventh stage. The third stage has a travel $c$ which is twice the value of $b$; the fourth stage has a travel $d$ which is twice the value of $c$; the fifth stage has a travel $e$ which is twice the value of $d$; the sixth stage has a travel $f$ which is twice the value of $e$; and finally the seventh stage has a travel $g$ which is twice the value of $f$.

The annular chambers 231 corresponding to the first stage, the annular chamber 250 corresponding to the second stage and the annular chambers 253, 259, 265, 271 and 277, corresponding respectively to the other stages up to and including the seventh stage are susceptible to be placed in communciation with the pressure supply fluid through the passageways 282, 284, 286, 288 290, 292 and 294 as controlled by valves 283, 285, 287, 289, 291, 293 and 295. In this fashion, any number of stages may be energized at will, to displace the last sleeve 278 of a quantity which is the sum of the strokes of the individual stages being energized. Last sleeve 278 in turn displaces reaction member 296. Reaction member 296, which is also a lap fit within the main bore 204, has an internal blind bore 299 to clear both the reduced end of sleeve 276 and the head of stop member 280. The other end of reaction member 296 has a reduced diameter 297 defining an annular chamber 298 between it and the main bore 204, and it is slidably guided through a bore in the end cap 300 fastened upon the open end of the housing 200. The end cap has an inner groove with an O-ring seal 301, and an outer groove with also an O-ring seal 302 to prevent leakage of fluid to the outside of the housing, and is fastened on the housing by cap screws or bolts 303 (FIG. 4).

The end of reaction member 296 projecting on the outside has a bore 304 with a thread 306 adapted to receive the threaded end of the output shaft 308.

Annular chamber 298 is filled by supply pressure fluid introduced through passageway 310 from the body of fitting 312. Fitting 312 controls the flow of fluid being admitted to or exhausted from annular chamber 298 by having a restricted calibrated port 314 in communication with channel 316 which in turn communicates with a supply pressure fluid manifold 318 through passageway 320 (FIG. 4). The fluid admitted into the annular chamber 298, pressing upon the area 305 of reaction member 296 biases the stages towards their retracted position. When one or more stages are energized, the pressure fluid admitted into the stages exerts its pressure upon an area which is greater than area 305, thereby forcing the stages to their extended position against the biasing pressure, and some of the fluid contained in annular chamber 298 is exhausted through calibrated port 314. Thus the presence of pressure fluid in annular chamber 298 has a two-fold purpose; it furnishes the means to bias, at all times, the actuator towards its retracted position, and by being forced to pass through the interchangeable calibrated orifice or port 314 during intake to and exhaust from chamber 298, it permits the user to determine the response time of the device according to his requirements.

Reaction member 296 has a groove 322 located substantially in the middle of its larger diameter. This groove defines an annular chamber 324 which is placed in communication with the hollow interior of the device through ports 326. There is thus provided an escape route for any fluid that may leak through to the interior of the device. The interior of the device is drained through passageway 328 to fluid return manifold 330 and returned to the system by conduit 332. In practice, the whole device is filled with this return fluid in order to avoid cavitation.

The operation of this embodiment is similar to the operation of the preceding embodiment. As indicated above, the first stage has a stroke $a$, the second stage has a stroke $b$ which is twice $a$, and so on to the last stage which has a stroke $g$ which is twice the stroke $f$ of the preceding stage. The device having seven stages in this example, there are 128 discrete positions available for the output shaft from the fully retracted position (position 0, binary 0000000), to the fully extended position (position 127, binary 1111111).

FIGS. 7–11 represent a third modification of the present invention, still using the same principles under a different configuration. In this modification, illustrated as having also seven stages, each stage consists of only one slidable member disposed within the main bore of a housing. When actuated by fluid pressure, each stage member is adapted to travel a predetermined distance defined between abutments, displacing at the same time all the stages between it and the output shaft, and a combination of stages displaces the output shaft the sum of the strokes of the stages being actuated. The device is loaded toward its retracted position by supply fluid pressure acting upon a partial area of the seventh stage, in a direction opposite to the direction in which the individual stages travel when actuated.

In the drawings of FIGS. 7 and 8, a housing 400 having a cylindrical main bore 402 is closed on one end by an end cap 404, fastened thereon by means of the cap screws or bolts 406. The end cap has a shoulder-like integral portion 408 fitted into the housing bore and provided with a groove 410 and an O-seal ring 412. An integrally formed link 414 projects a certain distance into the bore and has an upturned end portion or flange 416. Within the main bore 402 is disposed a series of piston elements designed generally by numerals 420, 422, 424, 426, 428, 430 and 432, having a lap fit with the bore being slidable therein.

FIGS. 9–11 show in detail one such piston element. A piston body 434 has an outside diameter adapted to slidably fit within the housing main bore. The body has two integrally formed L-shaped projecting extensions: a push rod 436 and a connecting link 438. Push rod 436 has a downturned end portion or flange 440 having an outer end face 442 adapted to abut against the side face 444 of the preceding piston, and an inner face or abutment surface 446. Connecting link 438 has an upturned end portion or flange 447 with an inner face or abutment surface 448. A longitudinal notch or groove 450 in the stem of push rod 436 gives the required clearance for the flange 447 of the preceding piston connecting link. A longitudinal notch or groove 452 in the stem of the connecting link 438 gives, in a similar fashion, the required clearance for the flange 440 of the following piston push rod.

FIG. 7 shows how the piston elements are interlinked within the main bore 402. The first piston element 420 has its push rod 436 interlinked with the projecting element 414 integral with the end cap 404. The second piston element 422, and all the subsequent piston elements have the end faces 442 of their respective push rods 436 in contact with the side 444 of the preceding piston when the device is in a retracted position as shown in FIG. 7. The last piston, 432, has a reduced diameter rod-like portion 450 adapted to receive the output shaft 452 adjustably fastened in a threaded bore 451 disposed substantially along the axis of rod-like portion 450. An end cap 454 is fastened upon the housing by the cap screws or bolts 456. The end cap has a groove with an O-ring seal 458 to prevent leakage to the outside of the housing, and a bore 460 with a groove and an O-ring seal 462 to allow the rod-like portion 450 to slide in and out from the housing. The annular chamber 464, thus disposed between the end face 466 of the piston 432 and the inner face of the end cap 454, is filled with pressure supply fluid admitted through passageway 468 from manifold 470. The fluid exerting a pressure upon the face 466 of piston 432 furnishes the biasing force necessary to retract the device in the same manner as hereinbefore explained in connection with the preceding embodiments of the invention.

Control valves 472, 474, 476, 478, 480, 482 and 484 are disposed on the housing 400 to control the stages of the actuator by admitting or exhausting pressure supply fluid through the passageways 473, 475, 477, 479, 481, 483 and 485. Fluid is thus admitted, as required, in the corresponding chambers 492, 494, 496, 498, 500, 502 and 504 where pressure is exerted on the opposing faces of two consecutive pistons forming the end walls of the respective chambers. For example, if fluid is admitted into chamber 498, when the device is in a retracted position, pressure will be exerted upon face 444 of piston 424 and upon face 445 of piston 426. Piston 424 cannot move because the end face of its push rod 436 abuts against the adjacent face of the preceding piston 422. Piston 422 cannot move for the same reason, i.e., because its push rod abuts against the adjacent face of the next preceding piston 420 which, in turn, is prevented to move by its own push rod abutting against the face of the end plate shouldered portion 408. However, the fluid pressure in chamber 498 acting upon the face 445 of piston 426 pushes piston 426 until the abutment 446 contacting the abutment 448 prevents further travel. Piston 426 has thus travelled a distance $d$ which is equal to the distance separating the two abutments 446 and 448 when the device was at rest. The travel or stroke of piston 426 is transmitted to the next following piston through the push rod 436 integral with the next following piston 428. In the same manner, the linear displacement of piston 428 is transmitted to piston 430 and to piston 432, the latter displacing the output shaft 452 of the same quantity $d$.

If fluid is now admitted to chamber 500, piston 428 travels a distance $e$ which is its stroke as determined by the distance separating its own abutment 446 from the abutment 448 of the next preceding piston. As piston 428 had already travelled a distance $d$, its total travel is now $d+e$. This travel is transferred to piston 430 and from it to piston 432 and the output shaft 452 in the manner hereinbefore explained. Although the sequence has been arbitrarily chosen in such a way as to describe the events as taking place in succeeding order, for the sake of simplicity of explanation, operation of the different stages of the actuator may take place in any order or contemporaneously.

In this embodiment also, the stroke of the first stage, pitson 420, is arbitrarily chosen to be a quantity $a$. The stroke of the second stage, piston 422, is arbitarily chosen to be a value $b$ twice that of $a$, and so on to the last stage, piston 432, which has a proper stroke $g$ which is twice that of the preceding stage $f$. Therefore, with seven stages as illustrated, 128 discrete positions are available including the fully retracted position 0 (binary 0000000) and the fully extended position (binary 1111111).

In each of the embodiments as shown, fluid pressure means acting upon an area of the last stage bias the actuator toward its retracted position. Other means, such as a coil spring, could be used as a biasing means without detracting from the scope and spirit of the invention.

A calibrated orifice to regulate the flow of biasing pressure fluid has been shown and described only in connection with the example of FIGS. 4–6. It is to be understood that such a calibrated orifice can also be used in combination with the examples of FIGS. 1–3 and FIGS. 7–11, if so desired. Also any number of stages may be used in the device instead of the six stages of the example of FIGS. 1–3 or the seven stages of the two other examples. For instance, an actuator comprising eight stages would give 256 possible discrete positions of the output shaft and an actuator having only five stages would give 32 possible discrete positions.

The devices have been generally shown with a stationary housing and a movable shaft. However, the output shaft could be maintained stationary and the housing could be allowed to move without departing from the scope and spirit of the invention.

Although the illustrated embodiments have been shown with the most significant digit stage connected to the output shaft while the least significant digit stage was connected to the stationary reference, it is obvious that this arrangement could be reversed, or if so preferred, any order of digit stages could be used. It is also obvious that the devices could be non-binary, and the ratio between stage strokes could be chosen as best fitting the purpose intended for the apparatus.

It is obvious that, for some special applications, several of such actuators as herein described and illustrated could be placed in series, in opposition or in parallel. For example, the output shaft of one actuator could be connected to the housing of another actuator in order to give a maximum resultant stroke which is the sum of the maximum strokes of each individual actuator. Two housings could be placed back to back or two actuators could be placed in a common housing with two output shafts movable through both ends of the housing.

The above examples are given only for illustrative purpose of a few of the possible combinations contemplated and it will be apparent to those skilled in the art that there is a great number of such possible combinations.

It is obvious that various changes, additions and omissions of elements may be made in details within the scope and spirit of the invention; and it is, therefore, to be understood that the invention is not to be limited to the specific details, examples, and preferred embodiments shown and described.

What is claimed is:

A positioner for linearly positioning a movable reference element in relation to a stationary reference element, said positioner comprising:

a stationary housing defining the stationary reference element and having a substantially cylindrical bore closed at one end and open at the other end;

a slidable output shaft defining the movable reference element and which is movable through the open end of the housing;

a plurality of cascaded motor stages slidably disposed end to end within the bore intermediate the closed end of said bore and the output shaft, each of said motor stages comprising:

a cylinder member slidable within the bore of the the housing and provided with a longitudinally aligned bore having a closed end and an open end, a bushing sleeve provided within the open end of the cylinder member and defining an abutment shoulder extending a predetermined distance into the bore of said cylinder member, a piston member slidably disposed within the bore of the cylinder member and being provided with an inner face end proximate the closed end of the bore in the cylinder member and an outer face end protruding thorugh the bushing sleeve in the open end of said bore, an abutment shoulder on the piston member for limiting the stroke thereof by engagement with the shoulder of the bushing sleeve, port means to admit fluid under pressure into a chamber defined by the inner face of the closed end of the cylinder member and the inner face end of the piston member to thereby cause said piston member to slidably move within said cylinder member until the abutment shoulder of said piston member is forced to engage the abutment shoulder of the sleeve bushing;

each of the motor stages being disposed in the bore in the housing with the protruding outer face end of its piston member pushing against the outer face of the closed end of the cylinder member of the next motor stage and forcing said next motor stage to travel a distance equal to the stroke of said piston member, and the piston member of the last stage being integral with the end of the output shaft situated within the bore of the housing;

fluid pressure biasing means applied upon an area of the piston member of the last motor stage for maintaining all the motor stages in contact with each other and thereby being less than the area upon which the fluid under pressure exerts the force that extends said piston member;

sealing means preventing fluid from leaking to the ambient past the output shaft;

separate sealing means to prevent the fluid admitted to the motor stages from leaking past the piston members of said motor stages;

and means for venting the bore of the housing to thereby preclude accumulation of fluid therein.

References Cited in the file of this patent

UNITED STATES PATENTS

| | | |
|---|---|---|
| 635,848 | Dutton | Oct. 31, 1899 |
| 691,692 | Von Zweigbergk | Jan. 21, 1902 |
| 1,561,341 | Martin | Nov. 10, 1925 |
| 2,197,867 | Klement | Apr. 23, 1940 |
| 2,443,345 | Ernst | June 15, 1948 |
| 2,699,757 | Tornkvist et al. | Jan. 18, 1955 |
| 2,931,340 | White | Apr. 5, 1960 |
| 2,948,264 | Freeman | Aug. 9, 1960 |
| 2,696,042 | Litz et al. | Jan. 24, 1961 |
| 2,974,492 | Gilovich | Mar. 14, 1961 |
| 2,981,287 | Caslow | Apr. 25, 1961 |

UNITED STATES PATENT OFFICE
CERTIFICATE OF CORRECTION

Patent No. 3,141,388                 July 21, 1964

Jack M. Brandstadter

It is hereby certified that error appears in the above numbered patent requiring correction and that the said Letters Patent should read as corrected below.

Column 4, line 54, after "c" strike out the comma; line 75, for "one" read -- own --; column 7, line 66, after "bore" insert -- and --; column 9, line 7, for "pitson" read -- piston --.

Signed and sealed this 17th day of November 1964.

(SEAL)
Attest:

ERNEST W. SWIDER
Attesting Officer

EDWARD J. BRENNER
Commissioner of Patents